(12) United States Patent
Tsai

(10) Patent No.: US 6,561,401 B1
(45) Date of Patent: May 13, 2003

(54) ARTICLE STORAGE DEVICE OF SCOOTER

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 0 days.

(21) Appl. No.: 09/702,660

(22) Filed: Nov. 1, 2000

(51) Int. Cl.$^7$ .................................................. B62J 7/00
(52) U.S. Cl. ...................... 224/431; 224/440; 224/547; 280/87.041; 280/263; 220/345.2; 220/351; 206/373; 206/376
(58) Field of Search ................................ 224/419, 428, 224/431, 433, 440, 539, 547, 557, 901.8; 220/345.3, 345.2, 348, 351; 206/376, 372, 373; 280/87.041, 263

(56) References Cited

U.S. PATENT DOCUMENTS

| | | | | |
|---|---|---|---|---|
| 1,508,150 A | * | 9/1924 | Albus | 224/420 |
| 1,658,496 A | * | 2/1928 | Qvarnstrom | 206/39 |
| 2,534,100 A | * | 12/1950 | Baumgartner | 108/34 |
| 5,279,413 A | * | 1/1994 | Nehl et al. | 206/0.82 |
| 5,480,249 A | * | 1/1996 | Kageyama et al. | 206/214 |
| 5,775,452 A | * | 7/1998 | Patmont | 180/181 |
| D414,220 S | * | 9/1999 | Catto | D21/423 |
| 5,954,349 A | * | 9/1999 | Rutzel | 280/100 |
| 6,135,276 A | * | 10/2000 | French et al. | 206/225 |

* cited by examiner

*Primary Examiner*—Stephen K. Cronin
(74) *Attorney, Agent, or Firm*—Browdy and Neimark, P.L.L.C.

(57) ABSTRACT

A scooter is provided with an article storage device which is formed of a base and a box body disposed slidably in the base. The base is disposed in a receiving space of the footboard of the scooter. The box body is provided in the top and in the underside with an article holding space to facilitate the storage of an article, such as a hand tool, an emergency medical aid, and the like.

12 Claims, 5 Drawing Sheets

ARTICLE STORAGE DEVICE OF SCOOTER

FIELD OF THE INVENTION

The present invention relates generally to a scooter, and more particularly to an article storage device of the scooter.

BACKGROUND OF THE INVENTION

The conventional scooter is not provided with a storage compartment for keeping articles, such as hand tools for repairing the scooter, emergency medical aids, etc.

SUMMARY OF THE INVENTION

The primary objective of the present invention is to provide a scooter with a storage device.

In keeping with the principle of the present invention, the foregoing objective of the present invention is attained by an article storage device which is disposed in the scooter footboard and is formed of a hollow tubular base and a box body slidably disposed in the base. The box body is provided with a compartment for keeping articles.

DETAILED DESCRIPTION OF THE INVENTION

Figure 1:
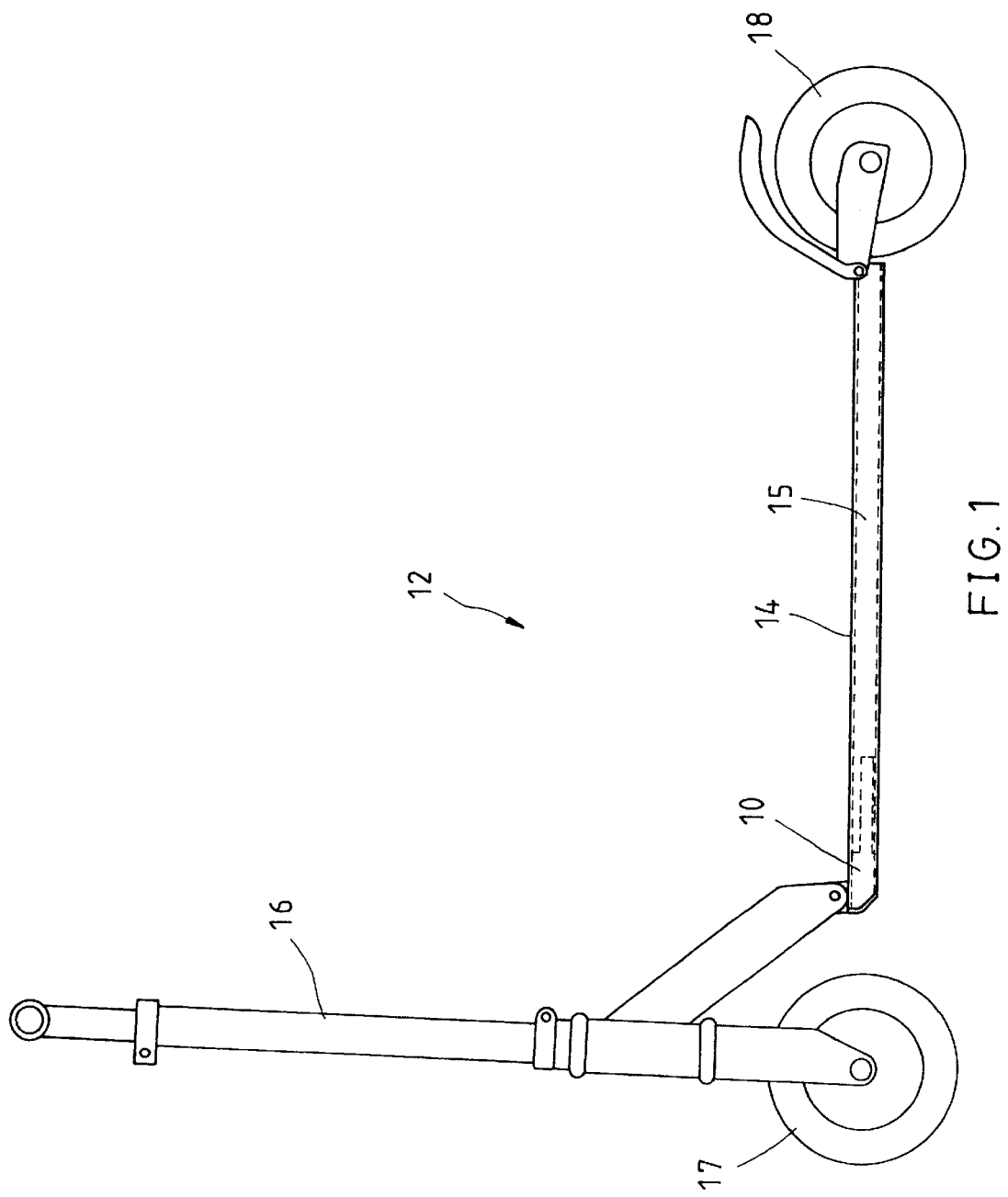
FIG. 1 shows a schematic view of a preferred embodiment of the present invention.
Figure 2:
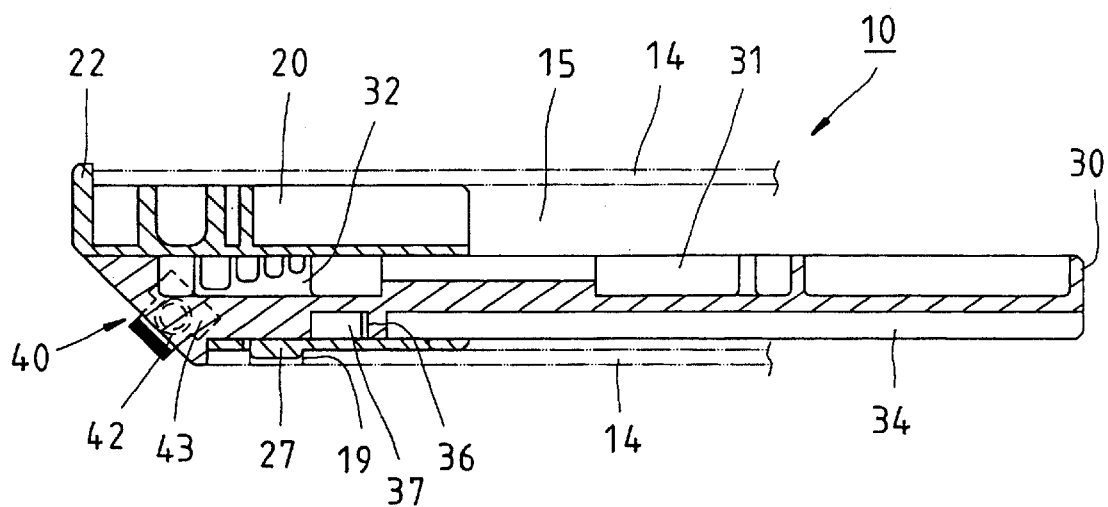
FIG. 2 shows a sectional view of the preferred embodiment of the present invention.
Figure 3:
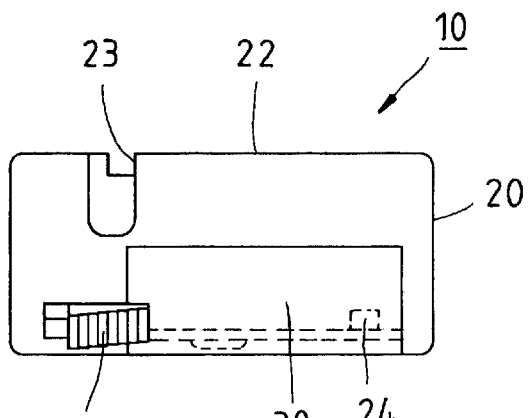
FIG. 3 shows a front view of the preferred embodiment of the present invention.
Figure 6:
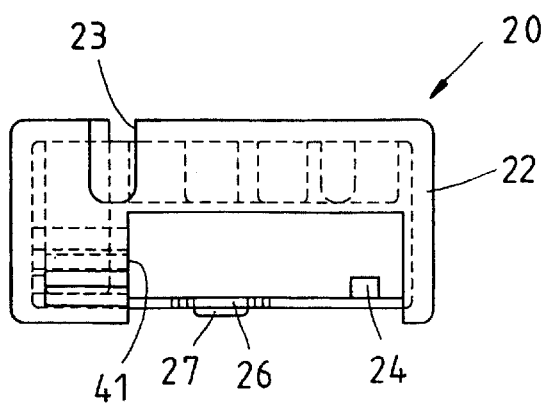
FIG. 6 shows a front view of the base of the preferred embodiment of the present invention.
Figure 4:
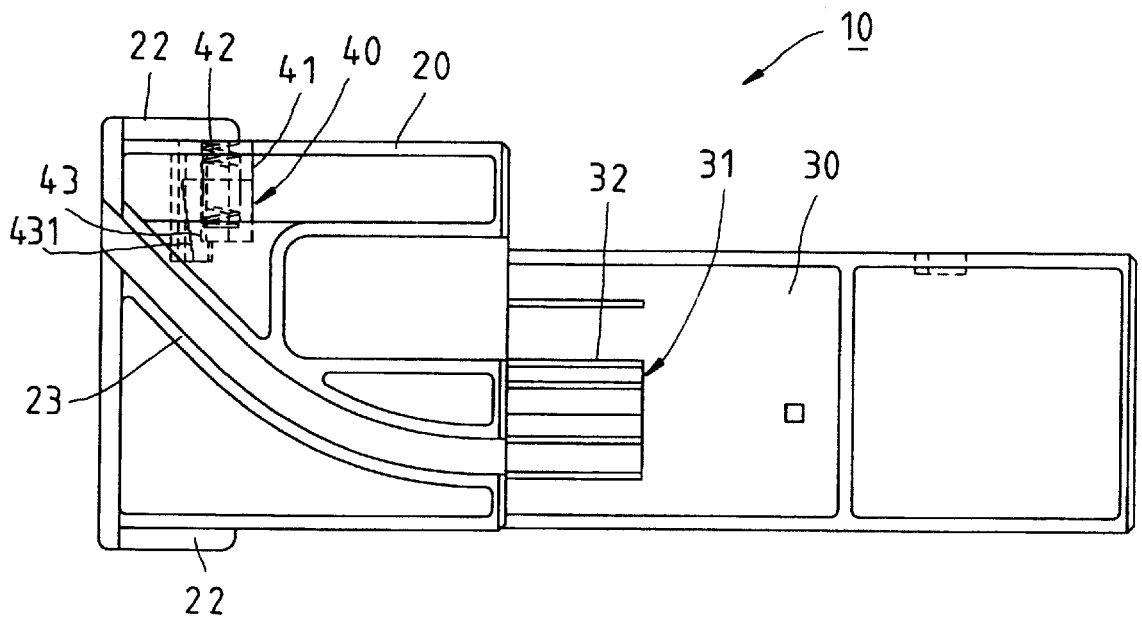
FIG. 4 shows a top view of the preferred embodiment of the present invention.

As shown in FIG. 1, an article storage device 10 of the preferred embodiment of the present invention is mounted on a scooter 12 comprising a footboard 14, a handlebar 16, a front wheel 17 pivoted to the bottom end of the handlebar 16, and a rear wheel 18 fastened to the rear end of the footboard 14 of aluminium. The footboard 14 is provided with a receiving space 15 extending from the front end to the rear end of the footboard 14. The storage device 10 comprises a base 20, a box body 30, and a retaining mechanism 40.

As shown in FIGS. 2–6, the base 20 has a rectangular cross section and is of a hollow tubular construction. The base 20 is disposed in the receiving space 15 of the footboard 14 and is composed of an attachment portion 22 extending outward from the front end of the base 20. The attachment portion 22 is joined with the front edge of the footboard 14. A curved slot 23 is disposed in the outer edge of the top wall of the base 20 for receiving a brake cable or control cable of the scooter 12. A projection 24 is extended from the bottom wall of the base 20. A U-shaped slot 25 is disposed in the bottom wall of the base 20 such that the U-shaped slot 25 partially encircles an elastic piece 26 which is provided in the underside with a protruded block 27. The footboard 14 is provided in the bottom wall with an insertion hole 19 for receiving the protruded block 27, so as to hold the base 20 and the footboard 14 together. The footboard 14 may be devoid of the insertion hole 19. The inner edge of the receiving space 15 is urged by the protruded block 27, thereby causing the elastic piece 26 to bend to provide the base 20 and the footboard 14 with friction.

Figure 5:
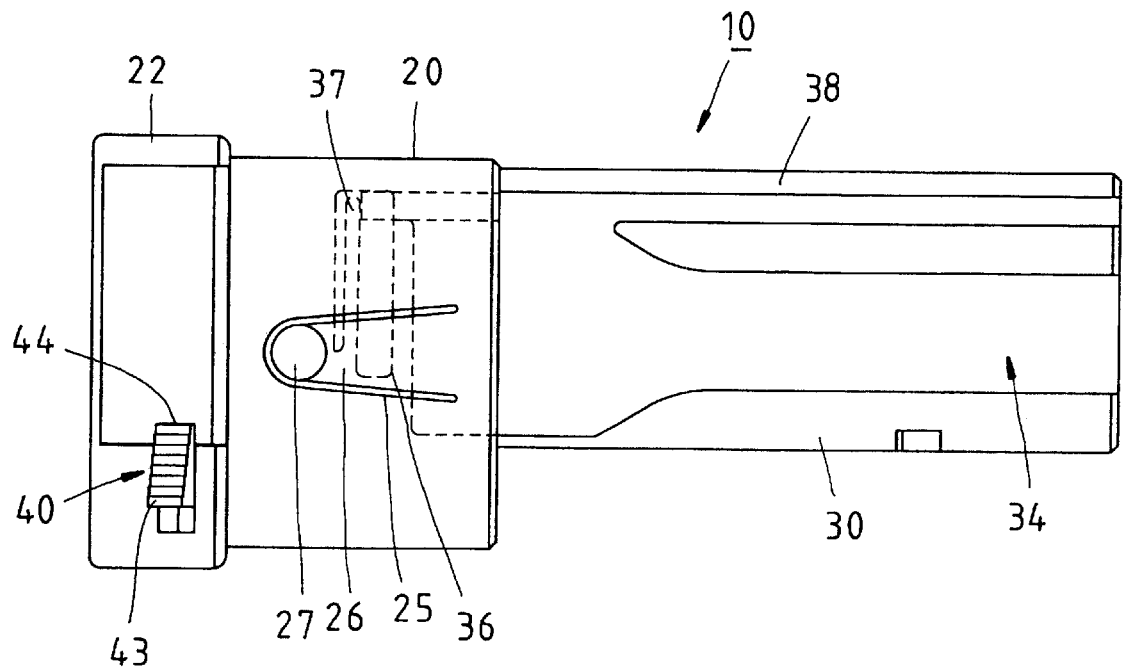
FIG. 5 shows a bottom view of the preferred embodiment of the present invention.
Figure 7:
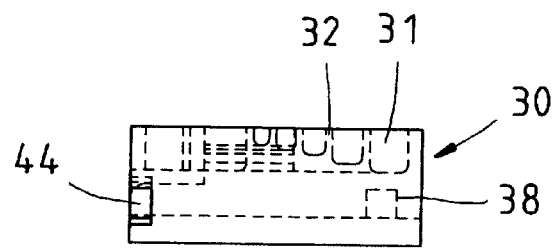
FIG. 7 shows a front view of the box body of the preferred embodiment of the present invention.
Figure 8:
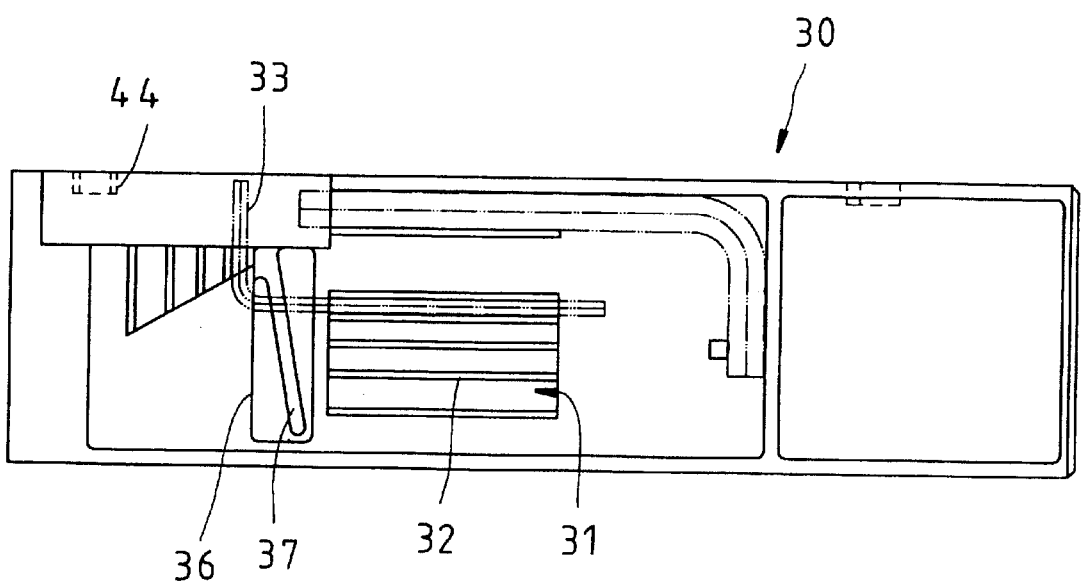
FIG. 8 shows a top view of the box body of the preferred embodiment of the present invention.
Figure 9:
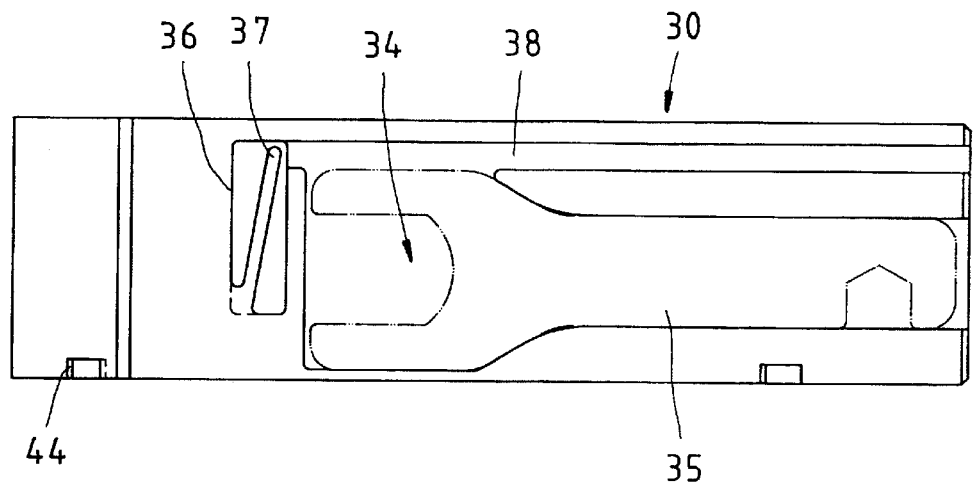
FIG. 9 shows a bottom view of the box body of the preferred embodiment of the present invention.

As shown in FIGS. 7–9, the box body 30 is slidably disposed in the base 20 and is provided in the top and the bottom thereof with an article storage space 31 and an article insertion space 34. The article storage space 31 is provided with a plurality of protruded ribs 32 which are so arranged to hold securely a hexagonal wrench 33. The insertion space 34 is intended to hold a flat wrench 35. The storage space 31 and the insertion space 34 may be designed in various ways to hold a variety of articles, such as emergency medical aids and the like. The box body 30 has a rectangular through hole 36 extending through the top and the bottom of the box 30. An elastic rod 37 is extended diagonally from the bottom of the inner edge of the through hole 36. A long slot 38 is disposed in the underside of the box 30 such that the long slot 38 is in communication with the through hole 36 and the atmospheric air for receiving the projection 24 of the base 20. As the box 30 slides into the base 20, the projection 24 slides along the long slot 38 to press the free end of the elastic rod 37, thereby causing the free end of the elastic rod 37 to deform, as shown in FIG. 5. The box 30 is thus provided with a prestress enabling the box 30 to be ejected.

The retaining mechanism 40 comprises a through hole 41 located in one side wall of the base 20, a spring 42 disposed in the through hole 41 such that one end of the spring 42 urges the inner edge of the receiving space 15 of the footboard 14, a retaining member 43 disposed in the through hole 41 such that the retaining member 43 is pushed by the free end of the spring 42 to bias toward the box body 30, and an insertion slot 44 disposed in the front end of the box body 30 for receiving the retaining member 43, so as to hold the base 20 and the box body 30 together. The retaining member 30 is further provided with a dial portion 431 for actuating the retaining member 43 to move away from the insertion slot 44, thereby resulting in separation of the box body 30 from the base 20.

Figure 10:
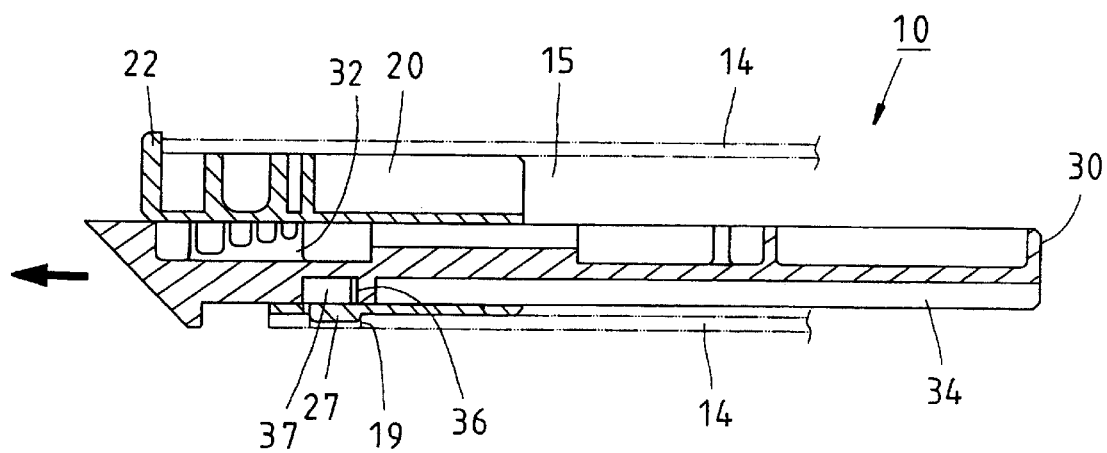
FIG. 10 shows a schematic view of the preferred embodiment of the present invention in use.

As shown in FIGS. 2–5, when the box body 30 is retracted into the base 20 such that the front ends of the box body 30 and the base 20 are level with each other, the box body 30 and the base 20 are held together by the retaining mechanism 40. In the meantime, the projection 24 urges the elastic rod 37 to deform so as to cause the box body 30 to have a prestress enabling the box body 30 to be ejected. When the retaining mechanism 40 is not at work, the box body 30 will be ejected from the base 20, as shown in FIG. 10. It is therefore readily apparent that the storage device 10 of the present invention can be used with ease without modifying the structural design of the scooter 12.

What is claimed is:

1. An article storage device of a scooter, said article storage device being disposed in a receiving space of a footboard of the scooter and comprising:

a base of a hollow tubular construction and disposed in the receiving space of the scooter;

a box body slidably disposed in said base and provided in a top thereof with an article storage space; and wherein said base is provided in a bottom wall with a U-shaped slot such that said U-shaped slot partially encircles an elastic piece, said elastic piece being provided in an underside thereof with a protruded block corresponding in location to an insertion hole of the footboard whereby said base is joined with the footboard such that said protruded block is inserted into the insertion hole of the footboard.

2. The article storage device as defined in claim 1, wherein said box body further comprises a through hole extending through the top and the bottom of said box body, an elastic rod extending horizontally out of an inner edge of said through hole, and a long slot extending along the longitudinal direction and communicating with said through hole and atmospheric air; wherein said base is provided in a bottom wall with a projection which is received in said long slot of said box body; wherein said storage device further comprises a retaining mechanism disposed in front ends of said base and said box body for holding detachably said base and said box body together such that said elastic rod is urged by said projection to deform so as to cause said box body to have a prestress enabling said box body to be ejected at the time when said retaining mechanism is no longer at work.

3. The article storage device as defined in claim 2, wherein said retaining mechanism comprises a through hole disposed in a side wall of said base, a spring disposed in said through hole such that one end of said spring urges an inner edge of the receiving space of the footboard of the scooter, a retaining member disposed in said through hole such that said retaining member is urged by a free end of said spring, and an insertion slot disposed in the front end of said box body for receiving said retaining member.

4. The article storage device as defined in claim 1, wherein said base is provided in a top wall with a curved slot for receiving a brake cable or control cable of the scooter.

5. The article storage device as defined in claim 1, wherein said box body is provided in an underside with an article insertion space.

6. An article storage device of a scooter, said article storage device being disposed in a receiving space in a footboard of the scooter, wherein the receiving space has an opening through a side wall of the footboard through which the article storage device is inserted into the footboard, said article storage device comprising:

a base of a hollow tubular construction which is fixed in the receiving space in a footboard; and a box body slidably disposed in said base and provided in a top thereof with an article storage space.

7. The article storage device as defined in claim 6, wherein said box body further comprises a through hole extending through the top and the bottom of said box body, an elastic rod extending horizontally out of an inner edge of said through hole, and a long slot extending along the longitudinal direction and communicating with said through hole and atmospheric air; wherein said base is provided in a bottom wall with a projection which is received in said long slot of said box body; wherein said storage device further comprises a retaining mechanism disposed in front ends of said base and said box body for holding detachably said base and said box body together such that said elastic rod is urged by said projection to deform so as to cause said box body to have a prestress enabling said box body to be ejected at the time when said retaining mechanism is no longer at work.

8. The article storage device as defined in claim 7, wherein said retaining mechanism comprises a through hole disposed in a side wall of said base, a spring disposed in said through hole such that one end of said spring urges an inner edge of the receiving space of the footboard of the scooter, a retaining member disposed in said through hole such that said retaining member is urged by a free end of said spring, and an insertion slot disposed in the front end of said box body for receiving said retaining member.

9. The article storage device as defined in claim 6, wherein said base is provided in a bottom wall with a U-shaped slot such that said U-shaped slot partially encircles an elastic piece, said elastic piece being provided in an underside thereof with a protruded block corresponding in location to an insertion hole of the footboard whereby said base is fixed to the footboard when said protruded block is inserted into the insertion hole of the footboard.

10. The article storage device as defined in claim 6, wherein said base is provided in a top wall with a curved slot for receiving a brake cable or control cable of the scooter.

11. The article storage device as defined in claim 6, if wherein said box body is provided in an underside with an article insertion space.

12. The article storage device as defined in claim 6, wherein the side wall of the footboard is the front end wall of the footboard.

* * * * *